United States Patent [19]

Harker

[11] Patent Number: 5,147,166
[45] Date of Patent: Sep. 15, 1992

[54] WALL ANCHOR
[75] Inventor: Brian G. Harker, Granger, Ind.
[73] Assignee: JTB, Inc., South Bend, Ind.
[21] Appl. No.: 601,308
[22] Filed: Oct. 22, 1990
[51] Int. Cl.⁵ .................... F16B 13/04; F16B 21/00; F16B 25/00
[52] U.S. Cl. .................................... 411/29; 411/340; 411/387
[58] Field of Search ............... 411/29, 340, 38, 34, 411/37, 341, 342, 344, 345, 346, 347, 60, 61, 387

[56] References Cited
U.S. PATENT DOCUMENTS

| | | |
|---|---|---|
| 67,071 | 7/1867 | Postawka . |
| 843,271 | 2/1907 | Hanlon . |
| 1,108,483 | 8/1914 | Abramson . |
| 1,112,557 | 10/1914 | Read . |
| 1,118,544 | 11/1914 | Galligan . |
| 1,236,538 | 8/1917 | Brown . |
| 1,956,623 | 5/1934 | Pleister ................... 411/346 |
| 2,398,220 | 4/1946 | Gelpcke ................... 411/342 |
| 2,751,052 | 6/1956 | Flora . |
| 3,143,915 | 8/1964 | Tendler ................... 411/29 |
| 3,232,163 | 2/1966 | Croessant . |
| 3,269,251 | 8/1966 | Bass . |
| 3,316,796 | 5/1967 | Young ................... 411/29 |
| 3,437,004 | 4/1969 | Pacharis . |
| 3,453,927 | 7/1969 | Moore ................... 411/387 X |
| 3,651,734 | 3/1972 | McSherry . |
| 3,983,779 | 10/1976 | Dimas . |
| 4,174,910 | 11/1979 | McSherry . |
| 4,181,061 | 1/1980 | McSherry . |
| 4,221,154 | 9/1980 | McSherry . |
| 4,286,497 | 9/1981 | Shamah ................... 411/345 X |
| 4,294,156 | 10/1981 | McSherry et al. . |
| 4,322,194 | 3/1982 | Eihorn . |
| 4,354,782 | 10/1982 | Newport . |
| 4,447,923 | 5/1984 | Bond et al. ................... 7/165 |
| 4,500,238 | 2/1985 | Vassiliou . |
| 4,566,832 | 1/1986 | Mirsberger et al. . |
| 4,617,692 | 10/1986 | Bond et al. ................... 411/29 X |
| 4,659,269 | 4/1987 | Stromiedel . |
| 4,902,179 | 2/1990 | Harker . |

FOREIGN PATENT DOCUMENTS

| | | |
|---|---|---|
| 148882 | 3/1937 | Austria . |
| 1207065 | 12/1965 | Fed. Rep. of Germany . |
| 1936360 | 3/1970 | Fed. Rep. of Germany . |
| 2721768 | 12/1977 | Fed. Rep. of Germany ...... 411/347 |
| 8003978 | 2/1980 | Fed. Rep. of Germany . |
| 470800 | 9/1914 | France . |
| 19652 | 1/1915 | France . |
| 537592 | 5/1922 | France . |
| 556979 | 12/1974 | Switzerland . |
| 979470 | 1/1965 | United Kingdom . |
| 1352075 | 5/1974 | United Kingdom . |
| 1463127 | 2/1977 | United Kingdom . |
| 1475839 | 6/1977 | United Kingdom . |
| 1558097 | 12/1979 | United Kingdom . |
| 2038979 | 7/1980 | United Kingdom . |
| 2051995 | 1/1981 | United Kingdom . |

Primary Examiner—Rodney M. Lindsey
Attorney, Agent, or Firm—Barnes & Thornburg

[57] ABSTRACT

An expansion-type wall anchor having a generally hollow body, a nut element, at least one, and preferably two, retention elements and an actuating element. The retention elements are pivotally connected to the nut element and transition from an orientation substantially parallel to the body to an extended position substantially perpendicular to the body once positioned behind a wall in a rearward cavity. At the end of the body opposite the nut element, the body includes an anchor head which is of greater dimension than the remainder of the hollow body. The anchor head is positioned generally transverse to the longitudinal axis of the body and secures the body to the exterior surface of the wall. The actuating element is positioned in an opening in the anchor head and extends within the length of the body to engage the nut element. Flanges extending from the anchor head preclude rotation of the anchor once it is embedded in the exterior surface of the wall. In some preferred embodiments, rotation of the actuating element creates a force which is exerted on deformable legs to cause the retention elements to transition from an orientation substantially parallel to the body to an extended position substantially perpendicular to the body. Continued rotation of the actuating element draws the retention elements into contact with the interior surface of the wall. Once the body is in place, the actuating element can be removed and the anchor body will remain in place.

19 Claims, 6 Drawing Sheets

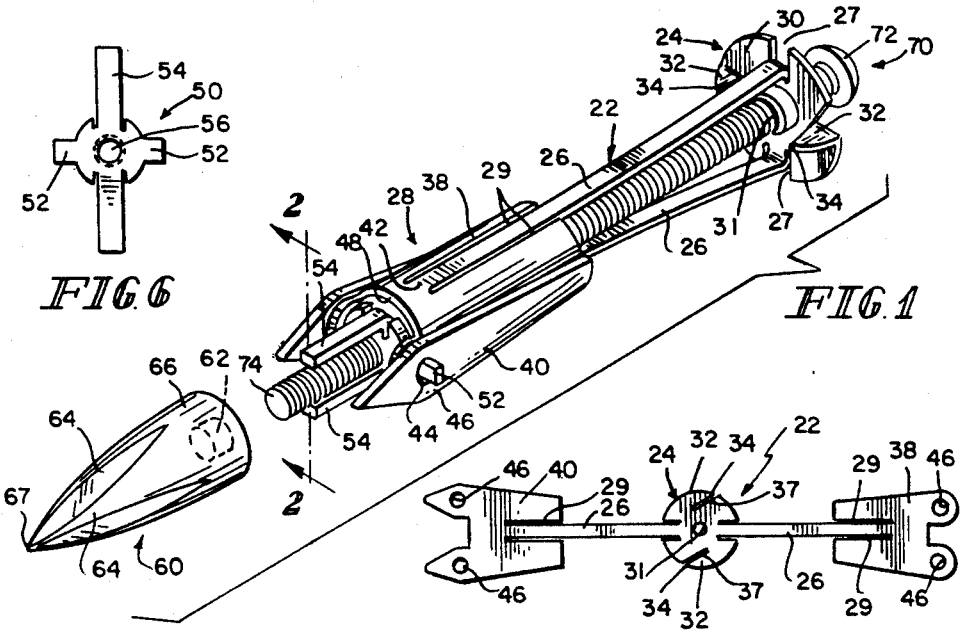
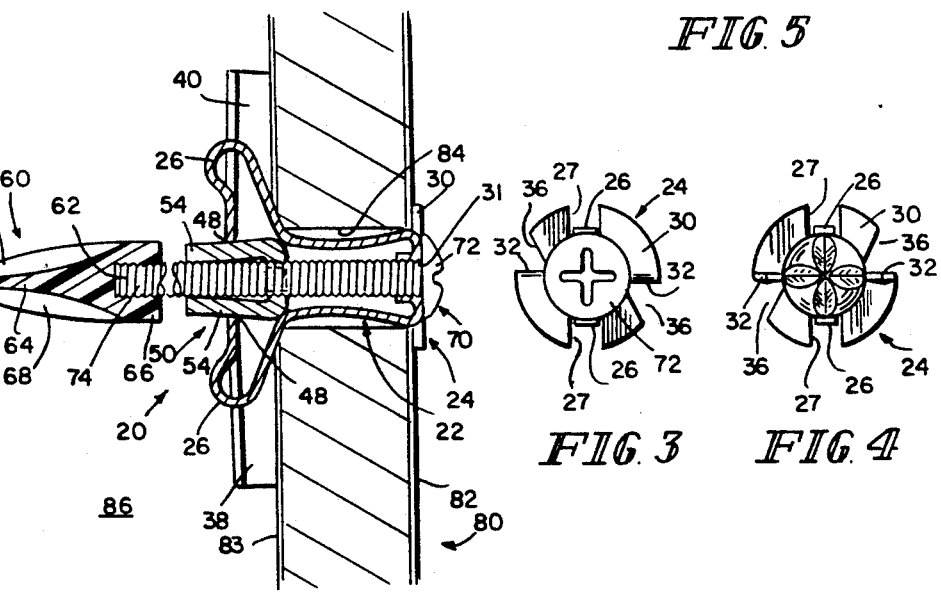

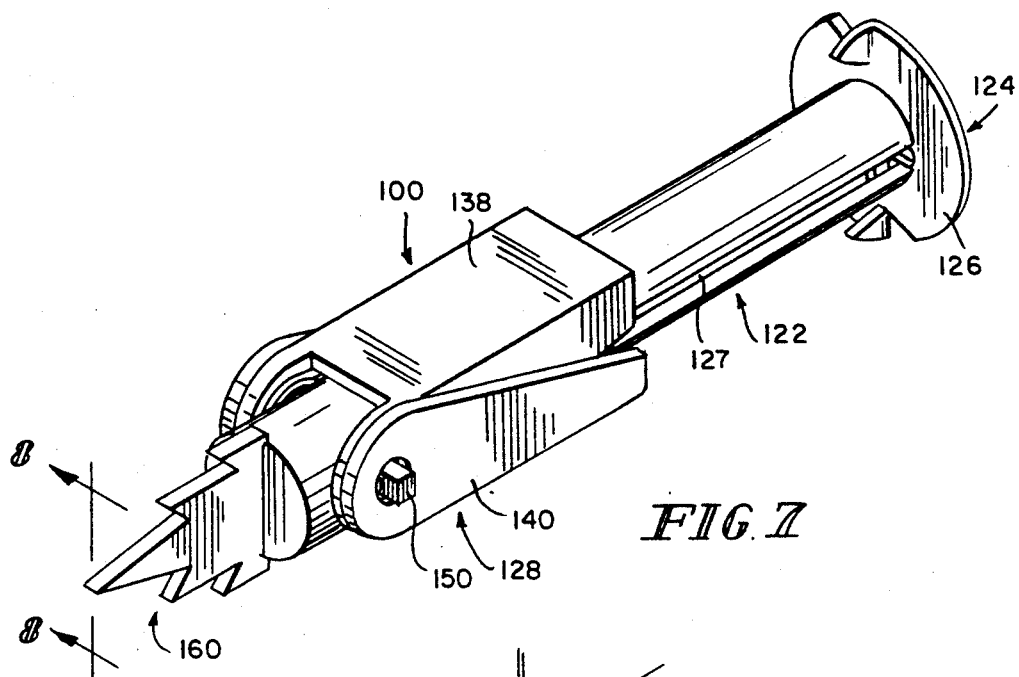
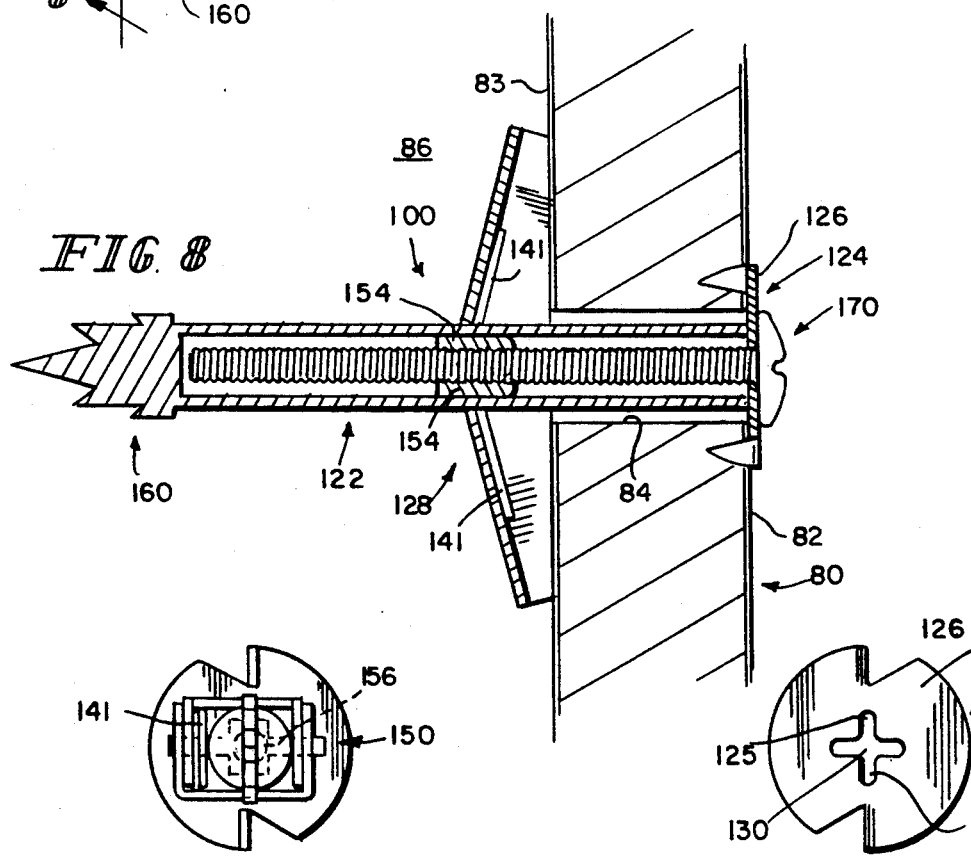

WALL ANCHOR

BACKGROUND AND SUMMARY OF THE INVENTION

The present invention relates generally to fasteners and anchors for mounting objects to structural members. More particularly, the present invention relates to expandable fasteners which provide enhanced load bearing capability when utilized in conjunction with drywall, paneling, plaster, or other structural members which, when used, have a rearward cavity.

Traditionally, wall fasteners of several types have been used. One method of mounting an object to a structural member is to place a standard screw or nail directly into the structural member. However, many structural members cannot provide the necessary support for standard screws or nails to bear the weight of a suspended object. This is the case with the interior walls of many residential, commercial and industrial buildings which are fabricated from drywall, paneling, plaster or similar structural members.

The interior walls of many homes are fabricated of drywall or some type of plasterboard. For example, sheets of drywall are fixed to a wooden frame such that a rearward cavity exists behind the drywall within the wall. Thus, when an object is affixed to the wall by means of a standard screw or nail, only a portion of the screw or nail typically remains in contact with the drywall. The remainder of the screw or nail protrudes behind the drywall into the rearward cavity, this protruding portion not providing any support for the suspended object.

Generally, applicant is aware of two types of wall anchors which have been developed to alleviate this problem. The first type of wall anchor is similar to a conventional nail or screw in that it consists of a single element which is driven directly into the wall. Such anchors commonly consist of a long slender shaft with a series of extending flanges or stops. Anchors of this type are shown in U.S. Pat. Nos. 2,751,052 to Flora and 3,983,779 to Dimas.

Such anchors have several disadvantages. Once the anchor is inserted into a wall, the flanges provide some resistance to anchor removal which provides the anchor with additional support. However, because the flanges are fixed and extend radially from the shaft of the anchor, portions of the wall adjacent to the bore created by the anchor are damaged by the flanges. This weakens the wall in the vicinity of the anchor, and makes it more likely that the suspended object will pull the anchor through the wall.

A second type of wall anchor includes a means for expanding the anchor within the rearward cavity once the anchor has been inserted into the wall. This type of device conventionally includes two or more separate elements, one element consisting of an anchor body and the other element providing a means for expansion. This expansion element is often a screw or nail. Devices of this nature are disclosed in U.S. Pat. Nos. 4,322,194 to Einhorn, 4,500,238 to Vassiliou, and 4,221,154 to McSherry.

Since such wall anchors generally provide greater expansion within the rearward cavity, they are generally capable of retaining heavier loads than single piece anchors. However, such anchors are often difficult to install and use. Many of these anchors require a predrilled hole, and the anchor is inserted into the predrilled hole. Predrilling the hole takes additional time and can be quite costly when large quantities of wall anchors are being installed.

One type of drywall fastener which does not require a predrilled hole is shown in U.S. Pat. No. 4,902,179 to Harker. This drywall anchor can be driven into a drywall board or wall by an ordinary hammer and includes a tapered portion which facilitates a clean and gradual cut through the wall. Further, an open portion within the drywall anchor can receive wall debris during penetration of the wall. However, the tapered portion does not facilitate installation of this drywall anchor into the wall by drilling or other rotational means.

Another wall anchor commonly used in buildings consists of spring biased, winged toggles which extend from a threaded nut. This threaded nut is used in conjunction with a conventional screw which is inserted through the object to be supported. While the winged toggles are in their folded position, the threaded nut passes through a predrilled hole in the wall and enters into the rearward cavity behind the wall. Once the winged toggles enter into the rearward cavity, the spring forces the toggles open. Once this has occurred, the screw is tightened until the toggles contact the interior side of the wall. At this point, the object is retained by the screw to the wall. However, it is sometimes desireable to remove and replace the object being supported. To do so, it is necessary to remove the screw from the threaded nut. However, when the screw is removed from the threaded nut, the threaded nut falls away from the predrilled hole into the rearward cavity. Thus, such wall anchors cannot be readily reused.

Wall anchors of this type can also be difficult to install once inserted into the wall. The spring mechanism releases the toggles only after they are completely within the rearward cavity. If any portion of the toggles remain within the predrilled hole, the toggles will not open. Once the toggles do open, there is a distance between the interior surface of the wall and the toggles of at least the length of a single toggle. When the toggles are suspended in the rearward cavity, rotation of the screw often also turns the toggles and, thus, the toggles are not drawn back towards the interior surface of the wall. To secure the anchor in position, the user often must first pull the screw away from the wall, thus pulling the toggles into contact with the interior surface of the wall. While holding the screw and the object to be suspended in this position, the user must then rotate the screw to draw the toggles towards the interior surface of the wall. This can be a difficult as well as time-consuming procedure.

Other multiple element wall anchors exist which do not utilize spring biased toggles. However, these anchors also have disadvantages. These anchors typically rely on the deformation of some portion of the anchor for expansion and retention of the anchor. Such an anchor is shown in U.S. Pat. No. 3,437,084 to Pacharis. This type of anchor is often ineffective because it fails to provide an adequate wall retention spread width for the weight of the object to be suspended. The wall retention spread width is the radially extending distance from the center of the expansion element to the furthest point of contact between the anchor and the interior surface of the wall. Since with these types of anchors, the deformable legs deform at a location intermediate the ends of the deformable legs and provide the sole means of engaging with the interior surface of the wall, the wall retention spread width provided can be no greater than one-half of the total length of the deformable legs. In many cases, the wall retention spread width is only one-third to one-fourth of the length of the deformable legs which extend into the rearward cavity. Thus, with these types of anchors, it is necessary to have deformable legs which are at least two, and often three to four times as long as the wall retention spread width desired. This requires additional material and limits the effectiveness of such anchors when utilized in a rearward cavity of limited depth.

Furthermore, since it is most desirable for the deformable legs to make contact with the interior surface of the wall in a predetermined triangular configuration, such anchors are typically most effective when utilized with a wall of the thickness for which that particular anchor was designed. Thus, multiple sized anchors are needed to accommodate various wall thicknesses, and further, the user needs to determine the thickness of a wall prior to installation.

A further limitation of many existing anchors is that they do not permit the installer to know when the anchor is securely in place. When a screw and a nut are used to clamp an object, one knows the nut is secured once turning of the screw becomes difficult. However, many of the existing anchors do not provide such notice to the installer. Therefore, the retention portion of the anchor could be pulled partially, or entirely, through the wall. This not only damages the wall, but also renders the anchor unable to provide support.

Accordingly, an object of the present invention is to provide a wall anchor which can be installed through a predrilled hole, or alternatively, by hammering or drilling the anchor into a wall.

A further object of the present invention is to provide a wall anchor which permits multiple removal and reinsertion of the actuating element, and which remains in position for reuse after the actuating element is removed.

Still another object of the present invention is to provide a wall anchor which minimizes the damage caused to the wall adjacent to the installed anchor.

Yet another object of the present invention is to provide a wall anchor which enhances load bearing capacity by increasing the wall retention spread width while at the same time minimizing the overall length of the anchor.

A still further object of the present invention is to provide a wall anchor which can be used on walls of varying thicknesses.

Still another object of the present invention is to provide a wall anchor which requires a reduced threading torque to be applied to the actuating element in order to attain full expansion of the retention element.

Yet another object of the present invention is to provide a wall anchor which does not require the user to pull the retention element against the inside surface of the wall before tightening the actuating element.

These and other objects of the present invention are attained by the provision of an expansion-type anchor having a generally hollow body, a nut element, at least one, and preferably two, retention elements and an actuating element. The retention elements are pivotably connected to the nut element and transition from an orientation substantially parallel to the body to an extended position substantially perpendicular to the body once positioned behind the wall in the rearward cavity. At the end of the body opposite the nut element, the body includes an anchor head which is of greater dimension than the remainder of the hollow body. The anchor head is positioned generally transverse to the longitudinal axis of the body and secures the body to the exterior surface of the wall. The actuating element is positioned in an opening in the anchor head and extends within the length of the body to engage the nut element. Flanges extending from the anchor head preclude rotation of the anchor once the anchor head is embedded in the exterior surface of the wall. In some preferred embodiments, rotation of the actuating element creates a force which is exerted on deformable legs to cause the retention elements to transition from an orientation substantially parallel to the body to an extended position substantially perpendicular to the body. Continued rotation of the actuating element draws the retention elements into contact with the interior surface of the wall. Once the body is in place, the actuating element can be removed to install the object to be suspended and the anchor body will remain in place.

Some preferred embodiments of the present invention include a penetration element with an interior cavity. This penetration element is affixed to the portion of the actuating element which extends through the nut element. Due to the fluted nature of the penetration element, the anchor may be inserted through a predrilled hole or, alternatively, hammered or drilled into the wall. Once the penetration element has completely pierced the wall and entered into the rearward cavity, the anchor is readily secured into position. Also, some preferred embodiments include retention elements which are spring biased. Thus, when the retention elements are completely within the rearward cavity, a spring forces the retention elements into their extended position.

Other objects, advantages and novel features of the present invention will become apparent from the following detailed description of the invention when considered in conjunction with the accompanying drawings.

BRIEF DESCRIPTION OF THE DRAWINGS

FIG. 1 is an exploded perspective view of a preferred embodiment of a wall anchor according to the present invention.

FIG. 2 is a cross-sectional side view of the wall anchor shown in FIG. 1, taken across lines 2—2 in FIG. 1 with the retention elements in their extended position.

FIG. 3 is a right end view of the wall anchor shown in FIG. 1.

FIG. 4 is a left end view of the wall anchor shown in FIG. 1.

FIG. 5 is a top view of the flat stamping used to fabricate the wall anchor shown in FIG. 1.

FIG. 6 is a top view of the flat stamping used to fabricate the nut element of the wall anchor shown in FIG. 1.

FIG. 7 is a perspective view of a second preferred embodiment of a wall anchor according to the present invention.

FIG. 8 is a cross-sectional side view of the wall anchor shown in FIG. 7, taken across lines 8—8 in FIG. 7 with the retention elements in their extended position.

FIG. 9 is a right end view of the body element of the wall anchor shown in FIG. 7, with the actuating element removed.

FIG. 10 is a left end view of the wall anchor shown in FIG. 7.

DESCRIPTION OF THE PREFERRED EMBODIMENTS

Figure 11:
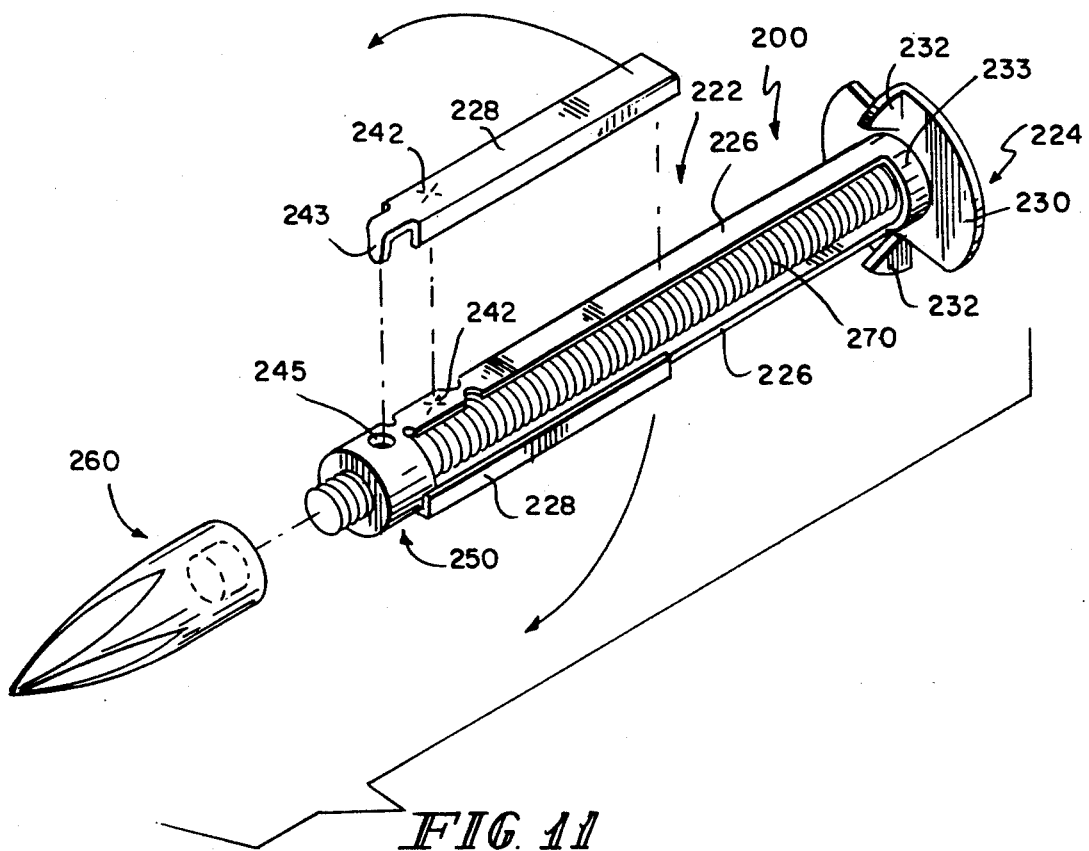
FIG. 11 is an exploded perspective view of a third preferred embodiment of a wall anchor according to the present invention.

Referring now to the drawings, in which like referenced characters indicate corresponding elements throughout the several views, attention is first directed to FIGS. 1 through 6 which illustrate a preferred embodiment of a wall anchor according to the present invention, indicated generally as 20. Anchor 20 includes body element 22, nut element 50, penetration element 60 and actuating element 70. Body element 22 includes at one end anchor head 24, at least one, and preferably two, deformable legs 26, and at the other end at least one, and preferably two, retention elements 28. Generally, it is desirable to have one retention element 28 for each deformable leg 26. Penetration element 60 is provided with interior cavity 62. Penetration element 60 is threaded on actuating element 70 after actuating element 70 is inserted into body element 22 and threaded through nut element 50. In the preferred embodiment shown, actuating element 70 is a conventional threaded screw. Preferably, body element 22 is fabricated from 0.025" thick cold rolled steel sheet. Nut element 50 is preferably fabricated from 0.060" thick cold rolled steel sheet. Penetration point 60 is preferably fabricated from nylon 6/6 30% glass filled. However, each of the above elements can be fabricated from other suitable materials.

Anchor head 24 is preferably generally circular in configuration and includes radially extending anchor head rim 30. Anchor head rim 30 is preferably of a greater dimension than the remainder of body element 22. Thus, anchor head 24 will be retained flush with exterior surface 82 of wall 80, and will not enter into opening 84 in wall 80 when body element 22 is pushed into wall 80.

Anchor head rim 30 is further provided with at least one, and preferably two longitudinally extending antirotation flanges 32. Antirotation flanges 32 are generally triangular in configuration, and transition into sharp points 34. Antirotation flanges 32 penetrate into exterior surface 82 of wall 80 to preclude further rotation of anchor head 24 when actuating element 70 is being threaded into nut element 50. Sharp points 34 facilitate this penetration.

While anchor head rim 30 is generally circular in configuration, in the preferred embodiment shown there are a plurality of notches 36 cut therein, each notch forming an associated antirotation flange 32. For ease of manufacture, each antirotation flange 32 is formed by cutting slit 37 into anchor head rim 30 and bending the material to form antirotation flange 32.

The remainder of body element 22 comprises at least one, and preferably two, deformable legs 26. Each deformable leg 26 is formed by bending material at anchor head 24. This creates cut-outs 27 in anchor head 24. Formed about deformable legs 26 at their end opposite anchor head 24 are retention elements 28. In the embodiment shown, retention elements 28 consist of inner toggle arm 38 and outer toggle arm 40. Deformable legs 26 are positioned such that the distance between opposite deformable legs 26 is greatest near anchor head 24, and least at the point where deformable legs 26 are attached to inner toggle arm 38 and outer toggle arm 40. This generally tapered configuration can engage with opening 84 in wall 80 near anchor head 24 to provide body element 22 with rotative resistance when actuating element 70 is rotated to effect actuation of retention elements 28.

FIG. 2 illustrates retention elements 28 in their extended position with inner toggle arm 38 and outer toggle arm 40 orientated substantially perpendicular to the longitudinal axis of body element 22. As seen in FIG. 1, outer toggle arm 40 is wider than inner toggle arm 38, and in the closed position folds over inner toggle arm 38. In addition to being attached to deformable legs 26 at points 42, inner toggle arm 38 and outer toggle arm 40 are pivotably attached to nut element 50 at points 44. Inner toggle arm 38 and outer toggle arm 40 are provided with openings 46 which are engaged by radially extending projections 52 on nut element 50.

In addition to projections 52, nut element 50 is provided with at least one, and preferably two longitudinally extending arms 54. Longitudinally extending arms 54 extend generally perpendicular to projections 52. Longitudinally extending arms 54 retain nut element 50 in an orientation such that threaded opening 56 of nut element 50 corresponds with the longitudinal axis of body element 22. Such an orientation permits actuating element 70 to be removed and readily reinserted into threaded opening 56. Also, longitudinally extending arms 54 provide a stop for retention elements 28. When inner toggle arm 38 and outer toggle arm 40 are in their extended position, toggle arm bases 48 abut longitudinally extending arms 54, which precludes further pivoting of retention elements 28.

In practice, actuating element 70 is placed into anchor head opening 31 within anchor head rim 30. Actuating element 70 is retained within body element 22 and engages with threaded opening 56 in nut element 50. Actuating element 70 is then rotated until actuating element head 72 is flush with anchor head rim 30. Penetration element 60 is then threaded to the protruding portion 74 of actuating element 70 by placing actuating element 70 within interior cavity 62 and threading penetration element 60 onto actuating element 70.

Once actuating element 70 has been installed within body element 22, and penetration element 60 has been installed to protruding portion 74 of actuating element 70, anchor 20 is ready to be inserted into wall 80. Anchor 20 can be inserted into wall 80 in three ways. First, anchor 20 could be inserted through a predrilled hole in wall 80. Second, anchor 20 could be struck directly into wall 80 by hitting actuating element head 72 and anchor head 24 with a hammer (not shown). Third, anchor 20 could be drilled into wall 80. A power drill or screwdriver (not shown) may be used to engage actuating element head 72, and the entire anchor 20 may then be drilled into wall 80. When drilling anchor 20 into wall 80, rotation of actuating element 70 should cease once penetration element 60 has completely pierced wall 80 and entered into rearward cavity 86. At this time, anchor 20 is readily pushed into position.

Penetration element 60 is provided with at least one, and preferably several flutes 64, which allow penetration element 60 to be readily hammered or drilled into wall 80. Flutes 64 preferably extend and diminishingly taper from full diameter portion 66 to initial penetration surface 67 of reduced diameter. Flutes 64 assist in cutting wall 80 and openings 68 retain the cut material when penetration element 60 is used to drill anchor 20 into wall 80. Alternatively, flutes 64 assist in cutting or slicing the paper commonly used on exterior surface 82 and interior surface 83 of wall 80 when penetration element 60 is hammered into wall 80. Such cutting or slicing of the paper minimizes the extent of damage or blowout of material adjacent opening 84 in wall 80.

As seen in FIGS. 13 through 16, an alternate preferred embodiment of a penetration element is shown, designated generally by the numerial 360. Penetration element 360 is similar to penetration element 60, except at least one, and preferably four, secondary fins 363 extend radially outward from full diameter portion 366 near the end of penetration element 360 opposite initial penetration surface 367. Secondary fins 363 are preferably substantially triangular in configuration and include a tapered cutting edge 365 extending towards initial penetration surface 367. Secondary fins 363 assist in cutting and enlarging opening 84 in wall 80 when penetration element 360 is used to drill wall anchor 20 into wall 80. Alternatively, secondary fins 363 assist in cutting or slicing the paper commonly used on exterior surface 82 and interior surface 83 of wall 80 when penetration element 360 is hammered into wall 80.

In addition to these functional advantages, penetration elements 60 and 360 also provide an aesthetic appearance and a new and ornamental design.

Once body element 22 is installed into wall 80 and antirotation flanges 32 are embedded in exterior surface 82 of wall 80, continued rotation of actuating element 70 will draw nut element 50 towards anchor head 24 thus exerting a compressive force on deformable legs 26. At the same time, deformable legs 26 will exert a moment on retention elements 28 about attachment point 44 via attachment point 42. This causes retention elements 28 to transition from an orientation substantially parallel to body element 22 into an extended position at a predetermined angular orientation relative to body element 22, pivoting about point 44. Although other angular orientations may be utilized, in the preferred embodiment shown the extended position of retention elements 28 is an orientation substantially perpendicular to body element 22. Longitudinally extending arms 54 prevent retention elements 28 from pivoting beyond their predetermined extended position. Continued rotation of actuating element 70 causes further deformation of deformable legs 26, which continue to deform within and beyond retention element slot 29. This deformation also causes nut element 50 to be drawn towards anchor head 24, and thus retention elements 28 are drawn towards anchor head 24 until retention elements 28 engage interior surface 83 of wall 80. The user becomes aware that anchor 20 is firmly in position when further rotation of actuating element 70 becomes difficult. Actuating element 70 may then be removed from body element 22 by rotating actuating element 70 in the opposite direction. Upon removal of actuating element 70, body element 22 and nut element 50 remain firmly affixed to wall 80 while penetration element 60 will fall away from actuating element 70 into rearward cavity 86.

In the preferred embodiment shown, it is contemplated that both body element 22 and nut element 50 are fabricated from a sheet metal stamping. However, it is well understood that there are numerous means of manufacture which could provide a device with these features. For example, this device could be manufactured by forming two identical halves, folding one on top of the other and keying them together. In a similar manner, the two halves could be hinged, and folded together to produce a device as described above. Also, rearward cavity does not have to be entirely open. For example, deformable legs 26 will position the toggle arms against interior surface 83 of wall 80, even though rearward cavity 86 contains insulation or other filler materials.

FIGS. 7 through 10 illustrate a second preferred embodiment of the present invention identified generally by reference number 100. This embodiment comprises anchor head 124 attached to tubular body element 122. In this embodiment, tubular body element 122 consists of a hollow, generally cylindrical housing with at least one, and preferably two, longitudinal slots 127. Attached to tubular body element 122 opposite anchor head 124 is penetration element 160. This embodiment of anchor 100 further comprises nut element 150. Nut element 150 includes one, and preferably two, radially extending projections 152. Radially extending projections 152 on nut element 150 are inserted into longitudinal slots 127 prior to the attachment of anchor head 124. In other preferred embodiments, opening 131 in anchor head base 130 is dimensioned to permit insertion of nut element 150 through anchor head 124 into longitudinal slots 127 in body element 122. Once nut element 150 is inserted into longitudinal slots 127, retention elements 128 are pivotably attached to radially extending projections 152, and nut element 150 is slideably retained in longitudinal slots 127. Nut element 150 is thus free to slide in the longitudinal direction within tubular body element 122 from the base of penetration element 160 to anchor head base 130. Nut element 150 also preferably includes at least one, and preferably two, longitudinally extending arms 154 which assist in maintaining the alignment of threaded opening 156 as discussed previously, as well as providing reinforcement of hollow tubular body element 122 when retention elements 128 abut tubular body element 122.

Inner toggle arm 138 and outer toggle arm 140 are pivotably connected to radially extending projections 152 of nut element 150 through longitudinal slots 127 in tubular body element 122. Spring mechanism 141 is biased to force inner toggle arm 138 and outer toggle arm 140 into their extended position.

In practice, tubular body element 122 could be inserted through a predrilled hole in wall 80 or drilled into wall 80 by engaging two perpendicular slots 125 or other drive means in anchor head 124 with a power drill or screwdriver (not shown) and rotating anchor head 124. Penetration element 160 facilitates penetration of tubular body element 122 through wall 80. Once tubular body element 122 is in place, spring mechanism 141 forces inner toggle arm 138 and outer toggle arm 140 into their extended position. Actuating element 170 is then placed in anchor head opening 131. Actuating element 170 is positioned within tubular body element 122 and engages nut element 150. Continued rotation of actuating element 170 forces nut element 150 to slide along longitudinal slots 127 towards anchor head 124. Anchor 100 is in place when inner toggle arm 138 and outer toggle arm 140 are in contact with interior surface 83 of wall 80.

Figure 12:
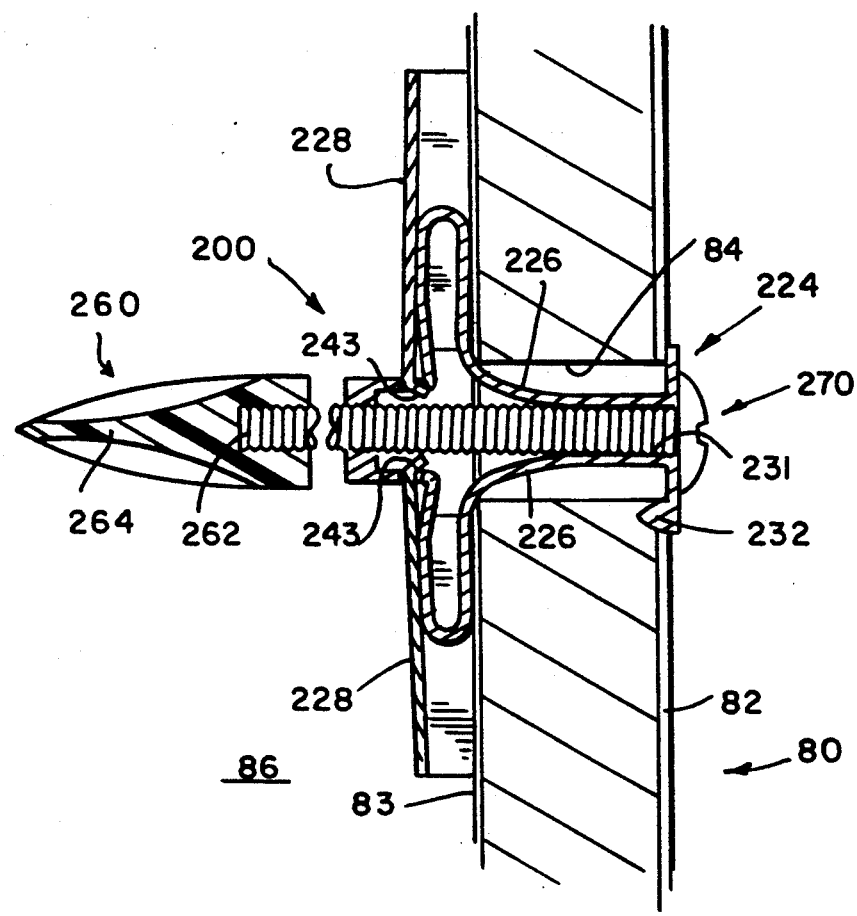
FIG. 12 is a cross-sectional side view of the wall anchor shown in FIG. 11, taken across lines 12—12 in FIG. 11 with the retention elements in their extended position.
Figure 13:
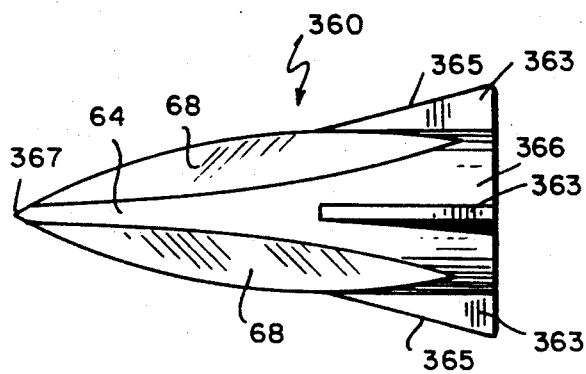
FIG. 13 is a side view of an alternate preferred embodiment of a penetration element for a wall anchor according to the present invention.
Figure 14:
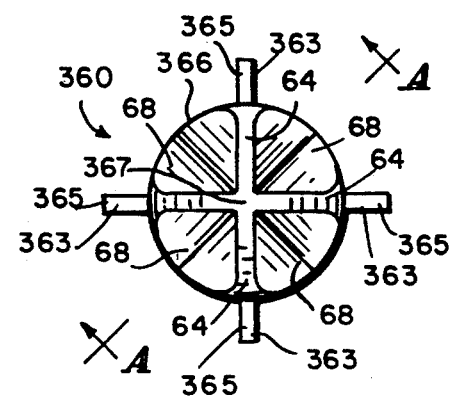
FIG. 14 is a left end view of the penetration element for wall anchor shown in FIG. 13.
Figure 15:
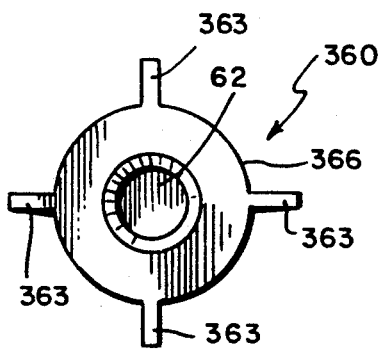
FIG. 15 is a right end view of the penetration element for wall anchor shown in FIG. 13.
Figure 16:
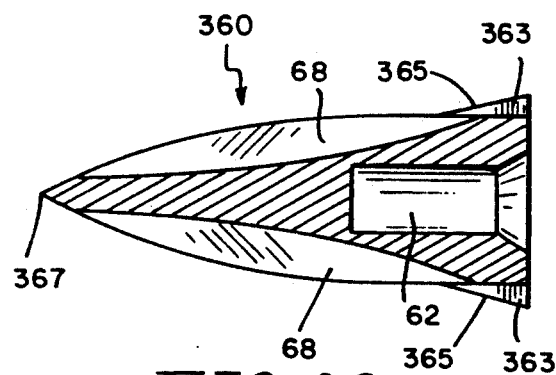
FIG. 16 is a cross-sectional view of the penetration element for wall anchor shown in FIG. 13 taken across lines A—A in FIG. 14.
Figure 17:
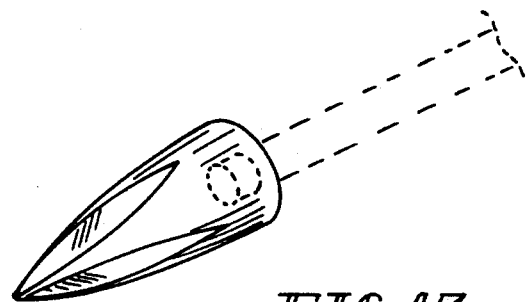
FIG. 17 is a perspective view of a new and ornamental design for a penetration element for a wall anchor according to the present invention.
Figure 18:
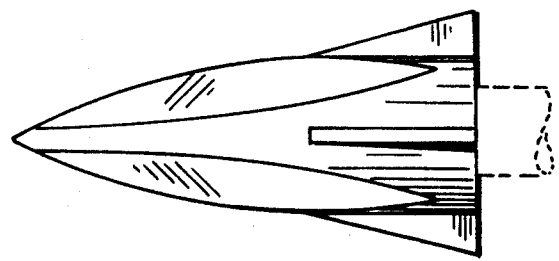
FIG. 18 is a side view of an alternate embodiment of a new and ornamental design for a penetration element for a wall anchor according to the present invention.
Figure 19:
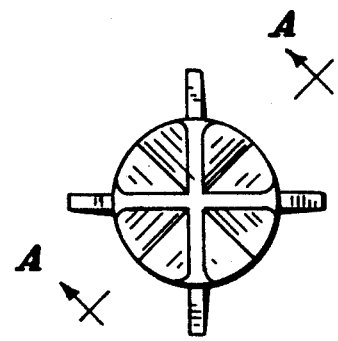
FIG. 19 is a left end view of the penetration element for wall anchor shown in FIG. 18.
Figure 20:
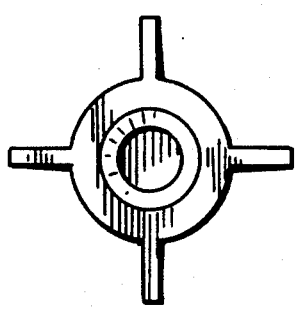
FIG. 20 is a right end view of the penetration element for wall anchor shown in FIG. 18.
Figure 21:
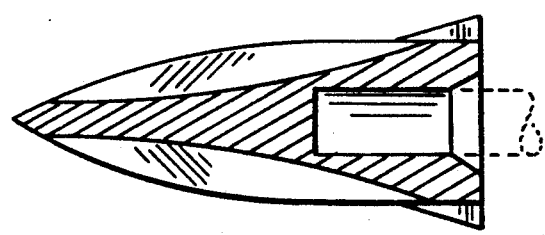
FIG. 21 is a cross-sectional view of the penetration element for wall anchor shown in FIG. 18 taken across lines A—A in FIG. 19.

FIGS. 11 and 12 illustrate a third preferred embodiment of the present invention. In this embodiment, wall anchor 200 consists of body element 222, penetration element 260, and actuating element 270. Body element 222 consists of anchor head 224, deformable legs 226 and nut element 250. Anchor head 224 is formed of anchor head rim 230 and anchor head base 233. Anchor head rim 230 is further provided with at least one anti-rotation flange 232.

Penetration element 260 includes internal cavity 262 which accommodates actuating element 270, which preferably consists of a conventional threaded screw. Penetration element 260 is preferably provided with at least one, and preferably several, flutes 264 therein.

Anchor head 224 and nut element 250 are connected by at least one, and preferably two deformable legs 226. Deformable legs 226 include at least one, and preferably two areas of reduced dimension which provide predetermined bend zones upon deformation of deformable legs 226. Each deformable leg 226 is further provided with a corresponding retention element 228. Retention elements 228 are attached to one end of deformable legs 226 at points 242. The attachment of retention elements 228 to deformable legs 226 can be accomplished by welding, riveting, bonding or some other means of attachment.

The first predetermined bend zone is preferably positioned adjacent nut element 250. The second predetermined bend zone in preferably intermediate attachment points 242 and anchor head 224. Most preferably, second predetermined bend zone is positioned adjacent attachment points 242 on deformable legs 226. By minimizing the distance between the first predetermined bend zone and the second predetermined bend zone, the rate of pivoting of retention elements 228 into their extended position is maximized. Retention elements 228 are further provided with non-translational tabs 243. Non-translational tabs 243 correspond to non-translational openings 245 in nut element 250. This relationship allows rotation but no translation between nut element 250 and retention elements 228. Although non-translational tabs 243 and non-translational openings 245 are shown in the same plane as retention elements 228, it should be recognized that they may be moved to other positions, for example, having non-translational tabs extending from the sides of retention elements 228 and engaging with non-translational openings located 90° from the plane of retention elements 228.

In this embodiment, anchor 200 is preferably inserted through a predrilled hole in wall 80 or hammered or drilled into position. Once positioned, rotation of actuating element 270 exerts a compressive force on deformable legs 226. This action mechanically forces retention elements 228 to expand into an extended position generally perpendicular to body element 222. The engagement of non-translational tabs 243 into non-translational openings 245 prevents translation between nut element 250 and retention elements 228, and also precludes continued rotation beyond a predetermined angular orientation of retention elements 228. Continued rotation of actuating element 270 causes further deformation of deformable legs 226. The overall height of retention elements 228 are such that they house deformed deformable legs 226. Thus, this deformation doe not hinder contact between retention elements 228 and interior surface 83 of wall 80.

It is further contemplated that this embodiment could be utilized with an actuating element comprising a hollow tube (not shown). Such a hollow tube (not shown) would rest within body element 222 and would engage nut element 250. The hollow tube (not shown) would include an opening which could be threadably engaged by a short screw (not shown) inserted through anchor head opening 231 and threaded into the opening in the hollow tube (not shown). Rotation of the inserted screw (not shown) would then activate retention elements 228 of this device.

Any one embodiment of the present invention may also utilize some of the features noted in the other embodiments. For example, it is contemplated that penetration element 60 could be replaced with penetration element 160, or vice versa. Furthermore, mechanically actuated retention elements 28 and 228 could be actuated with spring biased mechanism 141 in any of the embodiments.

From the preceding description of the preferred embodiments, it is evident that the objects of the invention are attained by the present invention. Although this invention has been described and illustrated in detail, it is to be clearly understood that the same is by way of illustration and example only and is not to be taken by way of limitation. Therefore, the spirit and scope of this invention are to be limited only by the terms of the appended claims.

What is claimed is:

1. A wall anchor for retaining an article to a structural member, said structural member having an exterior surface, an interior surface, and a rearward cavity adjacent said interior surface, said wall anchor comprising:

a body element having a first end, a second end and at least one deformable leg connected therebetween;

said first end of said body element including a first means for precluding continued movement of said first end of said body element beyond said exterior surface of said structural member;

a longitudinally extending actuating element which extends through said first end of said body element and engages with said second end of said body element;

at least one retention element attached to said second end of said body element, said retention element transitions from an orientation substantially parallel to said body element during insertion through said structural member to a predetermined angular orientation relative to said body element when said retention element is within said rearward cavity behind said structural member;

wherein rotation of said actuating element draws said retention element into contact with said interior surface of said structural member;

said wall anchor includes a first and a second retention element and said body element includes a first and a second deformable leg;

said first and said second deformable leg are positioned approximately 180° apart, and said first and said second retention element are positioned approximately 180° apart; and wherein deformation of said first and said second deformable leg in response to rotation of said actuating element causes transition of said first and said second retention element from a said orientation substantially parallel to said body element to said predetermined angular orientation relative to said body element when said first and said second retention elements are within said rearward cavity behind said structural member.

2. The wall anchor of claim 1, wherein said actuating element consists of a standard machine screw having external threads which engages with a nut element having internal threads, said nut element secured within said body element.

3. The wall anchor of claim 2, wherein said nut element includes a longitudinal extension which maintains the orientation of said internal threads in said nut element to permit said actuating element to be removed and reinserted into said internal threads of said nut element.

4. The wall anchor of claim 3, wherein said longitudinal extension of said nut element comprises a first and a second longitudinally extending arm.

5. The wall anchor of claim 4, wherein said nut element is fabricated from a single sheet metal stamping.

6. The wall anchor of claim 5, wherein said first end of said body element has a larger transverse dimension than the remainder of said body element to preclude movement of said first end of said body element beyond said exterior surface of said structural member.

7. The wall anchor of claim 6, wherein said first end of said body element includes a flange which engages with said exterior surface of said structural member to preclude rotation of said body element in relation to said exterior surface of said structural member.

8. The wall anchor of claim 7, wherein said body element and said first and said second retention element are formed from a single sheet metal stamping.

9. The wall anchor of claim 8, wherein said flange is formed by bending a portion of said first end of said body element rearwardly to an orientation substantially perpendicular to said first end of said body portion.

10. A wall anchor for retaining an article to a structural member, said structural member having an exterior surface, an interior surface, and a rearward cavity adjacent said interior surface, said wall anchor comprising:

a body element having a first end, a second end, and at least one deformable leg extending therebetween;

said first end of said body element includes an enlarged portion for precluding continued movement of said body element beyond said exterior surface of said structural member;

a nut element secured to said second end of said body element, said nut element including internal threads;

an actuating element having external threads, said actuating element extending through said first end of said body element and engaging with said internal threads in said nut element;

at least one retention element pivotably attached to said nut element, said at least one retention element transitions from a substantially longitudinal orientation during insertion through said structural member to a substantially transverse orientation within said rearward cavity behind said structural member;

rotation of said actuating element draws said nut element towards said first end thus causing deformation of said at least one deformable leg; and wherein deformation of said first and said second deformable leg in response to rotation of said actuating element causes transition of said first and said second retention element from a substantially longitudinal orientation to a substantially transverse orientation within said rearward cavity behind said structural member.

11. The wall anchor of claim 10, wherein said actuating element consists of a standard machine screw.

12. The wall anchor of claim 11, wherein said nut element includes a longitudinal extension which precludes continued transition of said at least one retention element beyond a substantially transverse orientation within said rearward cavity behind said structural member.

13. The wall anchor of claim 12, wherein said longitudinal extension of said nut element comprises a first and a second longitudinally extending arm.

14. The wall anchor of claim 13, wherein said nut element is fabricated from a single sheet metal stamping.

15. The wall anchor of claim 14, wherein said first end of said body element has a larger transverse dimension than the remainder of said body element to preclude movement of said first end of said body element beyond said exterior surface of said structural member.

16. The wall anchor of claim 15, wherein said first end of said body element includes a flange which engages with said exterior surface of said structural member to preclude rotation of said body element in relation to said exterior surface of said structural member.

17. The wall anchor of claim 16, wherein said body element and said at least one retention element are formed from a single sheet metal stamping.

18. A wall anchor for retaining an article to a structural member, said structural member having an exterior surface, an interior surface, and a rearward cavity adjacent said interior surface, said wall anchor comprising:

an actuating element having a portion which extends through said structural member into said rearward cavity;

an expandable retention element having a first end and a second end;

said first end of said expandable retention element being connected to said actuating element;

said second end of said expandable retention element being unconnected to said actuating element;

said actuating element having a first means for drawing said expandable retention element towards said interior surface of said structural member in response to rotation of actuating element after insertion of said expandable retention element into said rearward cavity;

a second means attached to said expandable retention element for precluding rotation of said expandable retention element upon rotation of said actuating element; and wherein said second end of said expandable retention element transitions from a first position substantially adjacent said actuating element to a second position a radial distance further away from said actuating element in response to said rotation of said actuating element.

19. The wall anchor of claim 18, wherein said actuating element includes a third means for precluding movement of said actuating element beyond said exterior surface of said structural member.

* * * * *

UNITED STATES PATENT AND TRADEMARK OFFICE
CERTIFICATE OF CORRECTION

PATENT NO.  :   5,147,166
DATED       :   September 15, 1992
INVENTOR(S) :   Brian G. Harker It is certified that error appears in the above-identified patent and that said Letters Patent is hereby corrected as shown below:

Column 1, line 42,
    insert -- U.S. Pat. No. -- before "3,983,779".

Column 2, line 58,
    delete "3,437,084" and insert -- 3,437,004" --.

Column 9, line 58,
    delete "no" and insert -- not--.

Column 10, line 14,
    delete "doe" and insert -- does --.

Signed and Sealed this

Fifth Day of October, 1993

Attest:

BRUCE LEHMAN

*Attesting Officer*           *Commissioner of Patents and Trademarks*